Sept. 7, 1943.   F. C. MOCK   2,328,736
NON-ICING THROTTLE
Filed Nov. 24, 1939
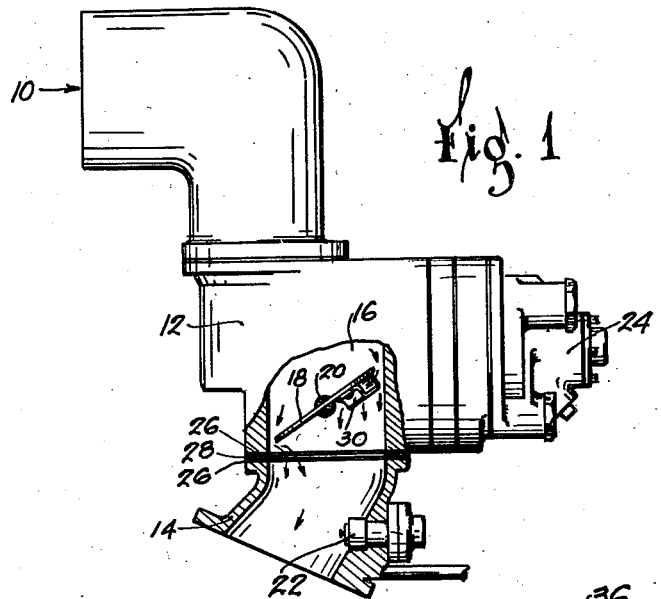
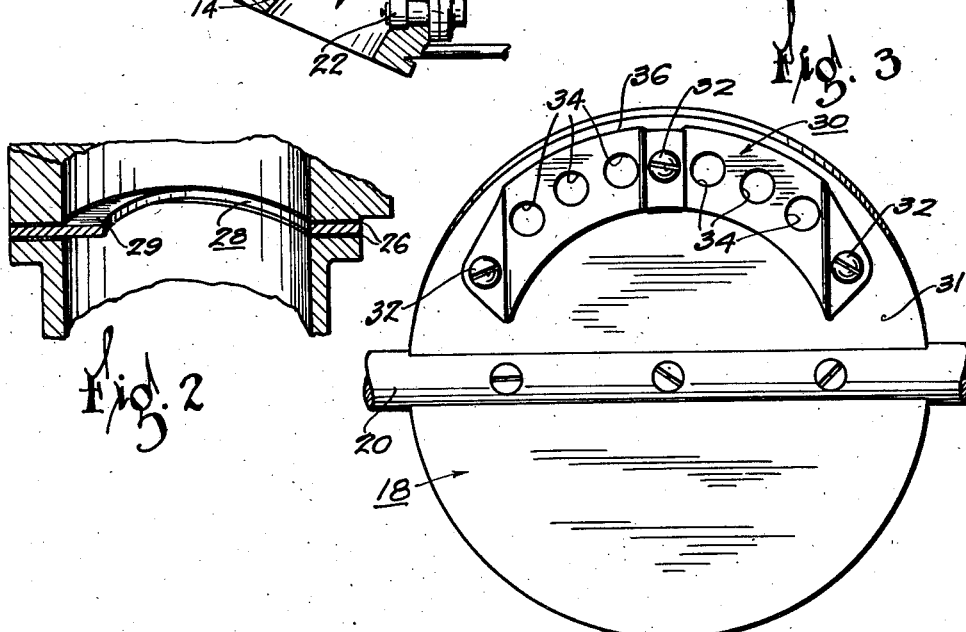
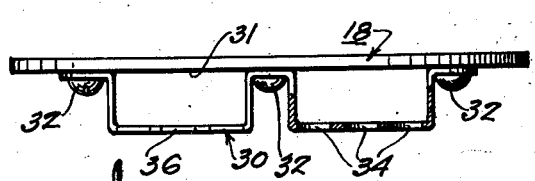
INVENTOR.
FRANK C. MOCK
BY A. L. McGrady
ATTORNEY.

Patented Sept. 7, 1943

2,328,736

UNITED STATES PATENT OFFICE 2,328,736

NONICING THROTTLE

Frank C. Mock, South Bend, Ind., assignor to Bendix Aviation Corporation, South Bend, Ind., a corporation of Delaware Application November 24, 1939, Serial No. 305,855

19 Claims. (Cl. 261—65)

This invention relates to carburetors and more particularly to a non-icing throttle valve for carburetors, especially of the anterior throttle type, and a method of preventing throttle icing.

It is well known that ice will form on the throttle valve and adjacent parts of a carburetor during operation under certain conditions of atmospheric temperature and humidity, unless heat is supplied either to the incoming air or to the parts on which ice would otherwise collect. Icing is primarily caused by the partial vaporization of the gasoline delivered into the carburetor air stream and the consequent absorption of heat from the air. If the relative humidity of the entering air is high, the resulting refrigerating effect may lower the temperature of the air to a value below the dew point and hence a portion of the atmospheric moisture will be precipitated on the walls of the induction passage and on any other portions of the carburetor in the path of the air stream. The sudden reduction in pressure and high velocity adjacent the throttle opening increases the rate of gasoline vaporization and refrigerating effect, thereby increasing the moisture precipitation in this region.

If the temperature at any point in the mixture passage is reduced below the freezing point of water, the moisture precipitation results in an accumulation of ice which will restrict the induction passage, sufficiently in some cases to prevent operation of the engine. A serious hazard, especially in aircraft, is thus created.

It is generally believed that an anterior throttle carburetor is free of throttle-icing, or nearly so, since the fuel is introduced into the air stream posterior to the throttle and consequently the refrigerating action of fuel vaporization and the accompanying moisture precipitation occurs beyond the throttle. For the most part the above is true; however it has been found that ice will sometimes form on the throttle of an anterior throttle carburetor during part throttle operation, particularly if the fuel discharge nozzle is not far removed from the throttle.

During part throttle operation strong eddy currents circulate in the lee of the throttle valve, moving as a swirl from the low pressure area along the walls of the induction conduit beyond the throttle into the central portion of the passage, thence moving in a direction opposite to the normal air flow and approaching the throttle valve, probably impinging thereagainst, and then passing parallel to the valve and into the low pressure region of the incoming air adjacent the throttle valve opening. These eddy currents are effective in creating reversed flow of air from a distance of several diameters beyond the throttle. In the majority of anterior throttle carburetors the fuel nozzle is located within the effective range of the eddy currents and as a result air from the vicinity of, or beyond, the nozzle circulates back to the throttle. This air has been cooled by the partial vaporization of fuel and may contain entrained particles of precipitated moisture along with particles of liquid fuel which has had insufficient time in which to vaporize.

Some of the fuel and water particles so entrained are deposited on the posterior face of the throttle valve, the remainder being carried by the air current into the low pressure, high velocity region adjacent the throttle opening where the fuel quickly vaporizes. Such vaporization cools the main air stream, causing additional moisture to be precipitated, and also cools the throttle valve and adjacent walls. Also, the eddy flow of air over the posterior face of the throttle valve vaporizes the fuel deposited thereon and consequently reduces the temperature of the valve. The valve and wall temperatures may thus be decreased to a value below the freezing point of water and as a result ice accumulates in sufficient quantities to constitute a hazard.

It is the object of the present invention to provide a throttle valve which will substantially eliminate reversed eddy currents posterior to the throttle at partially open throttle positions.

A further object of the invention is to provide deflector plates associated with the throttle valve which will deflect air from the main air stream into the space in the lee of the throttle valve at partially open throttle positions.

A further object of the invention is to provide a baffle plate associated with the induction passage posterior to the throttle for dispersing the air passing the throttle valve.

The invention will be readily understood from the following description taken in connection with the accompanying drawing, in which:

Figure 1 is a view in elevation, partially in section, of a carburetor embodying the invention;

Figure 2 is a perspective sectional view of a portion of the induction passage showing the induction passage deflector plate;

Figure 3 is a plan view of the throttle valve; and

Figure 4 is an end view of the throttle valve with the deflector plate partially broken away.

In Figure 1 there is shown a carburetor having an air entrance section 10, a main body section 12 and an adapter section 14. An induction passage 16 extends through said sections and is controlled by a throttle valve 18 fastened to a throttle shaft 20 which is rotatably mounted in the main body section.

A fuel discharge nozzle 22 positioned in the adapter section 14 receives fuel from a source, such for example as a metering unit 24 of the type described in applicant's copending application Serial No. 202,206, filed April 15, 1938, and delivers the fuel into the air stream posterior to the throttle.

The main body section 12 and adapter section 14 are separated by fiber gaskets 26 and a metal plate 28 located therebetween. The plate 28 projects a small amount from the side walls of one-half of the passage adjacent the trailing edge of the throttle to thereby form a crescent shaped baffle 29, best shown in Figure 2.

A deflector plate 30 is attached to the posterior face 31 of the throttle valve 18 by means such as screws 32 and is formed as an arcuate segment spaced from and parallel to the throttle valve face adjacent the leading edge thereof, as shown in Figures 3 and 4. A plurality of holes 34 may be provided in the plate 30 to disperse the air deflected thereby.

The outer edge 36 of the plate 30 preferably approaches the wall of the induction passage when the throttle valve is closed, as closely as possible without interfering with opening movement of the throttle.

In operation, with the throttle in a partially open position, air passing around the leading edge of the throttle valve encounters the deflecting plate 30. A portion of the air is thus diverted from the wall of the induction passage to a direction parallel to the plane of the throttle valve, the remainder passing the end of the deflecting plate 30 and continuing along the side of the passage. Of the air diverted by the deflecting plate, some passes through the holes 34 in the plate and thereby prevents a region of eddy currents under the plate.

On the opposite side of the throttle valve the projecting portion 29 of plate 28 deflects air toward the middle of the induction passage, and thus prevents the formation of eddy currents at the trailing edge of the throttle valve. As the throttle approaches the open position, there is no tendency to form eddy currents; the deflecting plate 30 is therefore no longer needed, and because of its parallel attachment to the throttle valve, it does not function.

It is obvious that by varying the distance between the throttle valve and the plate 30, the radial width of the plate 30, the clearance between the edge 36 of plate 30 and the induction passage wall when the throttle is in closed position, and the size, number and location of holes 34, various characteristics of the deflector plate may be varied, such as the degree of throttle opening at which the plate becomes effective as a deflector, the amount of air deflected at a given throttle position, and the extent of dispersion of the deflected air. Likewise the effectiveness of baffle 29 may be varied by changing the amount it projects into the induction passage and the distance between the baffle 29 and the throttle valve when the latter is in a closed position, the only requisite being that the baffle 29 should not interfere with opening movement of the throttle.

Although the invention has been shown and described with reference to a particular embodiment thereof, it is not limited to such embodiment nor otherwise except by the terms of the following claims.

I claim:

1. In a carburetor, an induction passage, a butterfly throttle valve therein, a main fuel nozzle discharging into said passage posterior to the throttle, and means for substantially preventing the carrying back of fuel to the throttle by preventing the formation of eddy currents posterior to the throttle valve, comprising a deflector plate attached to and spaced from the posterior side of the throttle valve, and a baffle extending into the induction passage from the walls thereof adjacent the throttle, said plate and baffle being adapted to deflect toward the center of the passage, a portion of the air passing the throttle.

2. In a carburetor, an induction passage, a butterfly throttle valve therein, a main fuel nozzle discharging into the passage posterior to the throttle, a deflector plate attached to and spaced from the posterior side of the throttle valve adjacent the leading edge thereof, and a baffle projecting into said passage from the wall thereof posterior to and adjacent the trailing edge of the throttle when in closed position.

3. In a carburetor having an induction passage, a butterfly throttle valve therein, a deflector plate attached to and spaced from the posterior side of the throttle valve adjacent the leading edge thereof, a plurality of holes in said plate, and a baffle projecting inwardly from the passage wall posterior to and adjacent the trailing edge of the throttle when in closed position.

4. In a carburetor having an induction passage, a pivotally mounted plate type throttle valve therein, a fuel discharge nozzle posterior to said throttle, a deflector secured to and spaced from the downstream face of the throttle valve, said deflector having a portion adjacent the leading edge of the throttle to deflect air passing said leading edge toward the center of the induction passage, and a deflector projecting into the induction passage from the walls thereof adjacent the trailing edge of the throttle valve and posterior thereto when said valve is in the closed position, to deflect air passing the trailing edge toward the center of the induction passage.

5. In a carburetor having an induction passage, a butterfly throttle valve therein, a fuel nozzle discharging into the passage posterior to the throttle, and a relatively narrow arcuate deflector plate secured to the posterior face of the throttle valve in spaced substantially parallel relationship therewith, said deflector plate being adjacent the leading edge of the throttle valve to deflect air passing said leading edge toward the center of the passage to thereby prevent any substantial eddy currents in the lee of the throttle valve during operation with the throttle in a partially open position.

6. The invention defined in claim 5 wherein said deflector plate is provided with a plurality of apertures to disperse the air received thereby.

7. In a carburetor having an induction passage, a pivotally mounted plate type throttle in the passage, a fuel nozzle discharging into the passage adjacent and posterior to the throttle, a deflector plate attached to and spaced from the posterior face of the throttle in substantially parallel relationship therewith and positioned adjacent the leading edge thereof to receive air flowing past said edge, and a plurality of apertures in the plate adapted to disperse the air received thereby to eliminate eddy currents posterior to the valve.

8. In a carburetor having an induction passage, a throttle in said passage of a type tending to create reverse eddy currents in the lee thereof, a fuel nozzle discharging into the passage posterior to the throttle, a deflector plate in the passage adjacent and posterior to the throttle and adapted to receive and deflect air passing said throttle, and a plurality of apertures in said plate for dispersing the air received thereby to eliminate eddy currents posterior to the throttle.

9. In a carburetor, an air passage, a pivotally mounted throttle therein of a type tending to create reverse eddy currents in the lee thereof, a fuel nozzle discharging into the passage posterior to the throttle, and means for substantially preventing throttle icing resulting from the carrying of fuel back to the throttle comprising means for directing a positive stream of air into the region of reverse air flow in the lee of said throttle to thereby counteract said eddy currents.

10. In a carburetor having an induction passage, a throttle valve therein of a type tending to create reverse eddy currents in the lee thereof, means for delivering fuel to said induction passage posterior to the throttle, and means for substantially preventing throttle icing resulting from the carrying of fuel back to the throttle comprising a plurality of air discharge orifices adapted to discharge air into the region of reverse air flow in the lee of said throttle to thereby counteract said eddy currents.

11. In a carburetor having an induction passage, a throttle valve therein, and an apertured deflector in the passage posterior to the throttle adapted to receive air passing the throttle and to disperse the same to substantially eliminate retrograde currents in the lee of the throttle.

12. A carburetor butterfly throttle valve comprising a disk, and a deflector plate attached to the disk comprising a substantialy arcuate segment spaced from and parallel to the posterior face of the disk and positioned adjacent the leading edge thereof, said plate having a deflecting surface of substantially less than half of the area of the disk.

13. A throttle valve for a carburetor comprising a valve member, a scoop secured to the posterior side of the valve member and positioned to receive air passing said valve member, and a plurality of apertures in said scoop member for dispersing the air received thereby.

14. A throttle valve for use in a carburetor comprising a plate adapted to be rotatably mounted in the induction passage of the carburetor, and a relatively narrow baffle secured to the posterior side of the plate adjacent the leading edge thereof and extending less than half way across the plate to divert air passing the edge of the plate toward the center of the passage to counteract retrograde currents in the lee of the plate.

15. In a carburetor having an induction passage, a butterfly throttle therein, a fuel nozzle discharging into the passage posterior to the throttle, and means for deflecting air toward the center of the passage in the lee of the throttle comprising a deflecting plate projecting into the passage from the walls thereof adjacent and posterior the trailing edge of the throttle, the surface of said plate being at an appreciable angle to the axis of said passage to deflect air passing the trailing edge of the throttle toward the center of the passage.

16. In a carburetor having an induction passage, a pivotally mounted throttle valve therein, and a deflecting surface posterior to the throttle extending into the induction passage from the wall thereof, said surface being at substantially right angles to the axis of the passage to deflect air toward the center of the passage.

17. A method of substantially preventing throttle icing in a butterfly throttle controlled induction passage for an internal combustion engine comprising supplying air to the induction passage, separately supplying fuel to the passage at a point posterior to said throttle, and directing positive currents from opposite sides of the induction passage adjacent the point of throttling toward the center of the passage to counteract retrograde currents flowing from the point of fuel introduction.

18. A method of forming a combustible mixture and substantially preventing throttle icing during part throttle operation in an internal combustion engine having an induction passage controlled by a throttle of a type tending to create retrograde currents in the lee thereof, comprising supplying air to said passage, separately supplying fuel to the passage at a point posterior to the throttle, and counteracting retrograde currents created by throttling and flowing from the vicinity of the point of fuel introduction by deflecting positive currents thereagainst from the point of throttling.

19. A method of substantially preventing throttle icing during part throttle operation in an internal combustion engine having an induction passage controlled by a pivotally mounted throttle member of a type tending to create retrograde currents in the lee thereof, comprising introducing the main fuel supply into the induction passage posterior to the throttle, and counteracting retrograde currents flowing from the vicinity of the point of fuel introduction by directing positive currents of air thereagainst.

FRANK C. MOCK.